United States Patent
Gasse et al.

[11] Patent Number: 5,945,224
[45] Date of Patent: Aug. 31, 1999

[54] STERILIZATION-RESISTANT BARRIER FILM BASED ON POLYAMIDES AND POLYOLEFINS

[75] Inventors: Andreas Siegmar Gasse, Walsrode; Rudi Klein, Walsrode, both of Germany

[73] Assignee: Wolff Walsrode AG, Walsrode, Germany

[21] Appl. No.: 08/683,933

[22] Filed: Jul. 19, 1996

[30] Foreign Application Priority Data

Jul. 28, 1995 [DE] Germany .......................... 195 27 491

[51] Int. Cl.⁶ .................................................... B32B 27/08
[52] U.S. Cl. .................................... 428/474.1; 428/474.9; 428/475.5; 428/475.8; 428/476.1; 428/476.3; 426/113; 426/114; 426/127; 426/128; 426/129; 426/130; 383/109
[58] Field of Search .............................. 428/474.7, 474.9, 428/475.5, 475.8, 476.1, 476.3; 426/114, 113, 128, 127, 129, 130; 383/109

[56] References Cited

FOREIGN PATENT DOCUMENTS

| | | |
|---|---|---|
| 0475720 | 3/1982 | European Pat. Off. . |
| 0288972 | 11/1988 | European Pat. Off. . |
| 0530549 | 3/1993 | European Pat. Off. . |
| 2048775 | 12/1980 | United Kingdom . |

OTHER PUBLICATIONS

U.S. application Serial No. 07/931,162, filed Aug. 17, 1994 (equivalent to EP–A–0–530,549).

Database WPI, Section Ch, Week 9345, Derwent Publications Ltd., London, GB; Class A18, AN 93–356894 XP002019831 & JP–A–05 261 874 (Okura Ind. Co. Ltd.), (Oct. 12, 1993).

Database WPI, Section Ch, Week 9551, Derwent Publications Ltd., London, GB; Class A17, AN 95–400306 XP002019832 & JP–A–07 276 582 (Sumitomo Bakelite Co. Ltd.), (Oct. 24, 1995).

*Primary Examiner*—Jose' G. Dees
*Assistant Examiner*—Michael A. Williamson
*Attorney, Agent, or Firm*—Sprung Kramer Schaefer & Briscoe

[57] ABSTRACT

The present invention relates to sterilisation-resistant barrier films based on polyamides and polyolefins, wherein the film consists of

- at least one aliphatic polyamide layer (A) and
- at least one polymer blend layer (B), which consists of 50–85 wt. % of polyarylamide and 15–85 wt. % of aliphatic polyamide and
- at least one thermoplastic heat sealing layer (C) of a polyolefin having a crystallite melting point of 121° C. or above (C1) or of a polymer blend containing at least one polyolefin having a crystallite melting point of 121° C. or above (C2) and
- at least one bonding layer (D), arranged in such a manner that a heat sealing layer and a layer of aliphatic polyamide are located on the outer sides of the film, and wherein the film is not stretched.

17 Claims, No Drawings

STERILIZATION-RESISTANT BARRIER FILM BASED ON POLYAMIDES AND POLYOLEFINS

The present invention relates to a multi-layer thermoforming film based on polyamides and polyolefins, which is distinguished in that it is sterilisation-resistant, does not become cloudy after sterilisation and has good gas barrier properties even at high relative humidity. The application of such a film is in particular in packaging foodstuffs.

Various processes are known for the sterilisation of films or the pack contents in packaging films. A distinction is drawn between gas sterilisation (conventionally with ethylene oxide), gamma ray sterilisation and steam sterilisation. These processes are conventionally performed in autoclaves. Sterilisation is performed at temperatures of above 100° C., wherein the material to be sterilised is exposed to this temperature for 30 minutes. The most frequently used temperature is 121° C. in a counterpressure autoclave. The prior art relating to "films for steam sterilisation" will now be described.

Films which are heat sealable must have at least two layers, wherein one layer acts as the support and one as the sealing layer. Although, if the support is aluminium, paper or an oriented film, it may indeed be sterilisation-resistant, it cannot be thermoformable. Examples of such materials are described in EP 474 587, JP 56082 247, JP 05031867, DE 3623 568 and EP 21 578. These films have the disadvantage that, due to the stretching—as a rule efforts are made, for example, for reasons relating to strength and/or cost, to obtain the greatest technically feasible biaxial or monoaxial drawing—they are no linear thermoformable and are therefore fundamentally non-usable for the required applications.

Suitable support materials which are in principle thermoformable are unstretched polymer layers such as polycarbonate (NL 7214460), polystyrene (BE 877 054), polypropylene (CA 1150 461, J5 4032 584), polybutylene terephthalate (JP 06226930) etc.

Combinations of polyamide and polyolefins are traditionally characteristic of flexible thermoforming films used for packaging foodstuffs. In such applications, polyamide is conventionally used as the support material and polyolefins as the material of the heat sealable layer (for example GB2 023 088). The type of polyamide traditionally used in thermoforming films is predominantly polyamide 6. Polyamide 6 has the disadvantage of having frequently inadequate barrier properties.

At variance with the use of pure polyamide 6, the patent literature makes reference to the use of polyamide blends prepared from amorphous and aliphatic polyamides, for example in stretched films (EP 0 065 278, FR 2 348 805, U.S. Pat. No. 4,800,129). These films have the disadvantage that, due to the stretching (efforts are generally made, for example on grounds of strength and/or cost, to achieve the greatest technically feasible biaxial or monoaxial drawing), they are no longer thermoformable.

The use of polyamide blends containing aliphatic and amorphous polyamide in thermoformable films is also described. The patent literature makes reference to films which manage with a single layer of such a polyamide blend (EP 0 408 390, AU 8 825 700, EP 0 358 038, JP 1 006 056, DE 2 309 420). Such films are characterised in that, while they are indeed more readily drawable (for example EP 0 408 390, example III, table 3) than polyamide 6 films (polyamide 6 is distinctly more crystalline than a polymer blend containing amorphous polyamide), they have distinctly higher coefficients of friction (Jacobi, H. R., *Kunststoffe* 47 (1957); Vieweg, R., Müller, A., *Kunststoffhandbuch* volume IV, C. Hanser Verlag, Munich, 1966, page 540) and thus have poor surface slip. Single-layer films are not heat sealable.

Films are also known from the patent literature which manage with two layers, wherein one layer consists of a polyamide blend containing aliphatic and amorphous polyamide and another layer consists of heat-sealable material (EP 0 526 814, JP 60 097 850, EP 0 287 839, EP 0 104 436). While, in comparison with the single layer films, these films do indeed have the advantage of being heat-sealable, the problem of poor surface slip nonetheless remains and the films are not generally sterilisable.

In order to achieve greater impermeability to gases in comparison with polyamide 6 or other aliphatic polyamides, it is known to prepare blends with EVOH (EP 380123A, EP 62822, EP 46788A, EP 466521A, EP 305146A) and to use EVOH alone. The disadvantage of such films is that sterilisation causes severe clouding and loss of the previously good oxygen barrier properties.

A large proportion of sterilisation-resistant films may be produced using laminating adhesives (DE 3545 768, EP 474 587, JP 03254939, EP 26 954, EP 21 578, DT 2829 871, BE 877 054, J5 1124 180, NL 7214460, EP 50 255, EP 225 164). Alternative production methods (for example coextrusion) have not been explicitly mentioned.

Polypropylene, polypropylene copolymers or polymer blends containing polypropylene-based polymers are preferably used as the sealing layer material in sterilisable films (JP 03254 939, JP 03126 557, EP 0629227, JP 63270 140, EP 288 972, DE 3545 768, DE 3431 364, DE 3315 652, EP 21548, JP 54032 584, JP 51124 180, NL 72114460). While such materials do indeed ensure sterilisability due to their elevated crystallite melting points, for the same reason they may be heat sealed only at very high sealing temperatures. Alternative, sterilisation-resistant heat sealing layer materials have also not been mentioned.

Sterilisation resistance to 121° C. was explicitly mentioned in the patents EP 0629227, EP 50 255, EP 21578 and NL 7214460. In all cases the sealing layers are polypropylene or polypropylene copolymers. Polyethylenes are also mentioned, but lower sterilisation temperatures are stated (for example JP 56082247: <100° C.).

To summarise, it may be stated that the requirements for thermoformability, heat sealability, surface slip, sterilisability, transparency and impermeability to gases cannot simultaneously be achieved. According to the patent literature, the latter three requirements in particular mean that a film is either impermeable to gases (EVOH-based), but then becomes cloudy on sterilisation, or does not become cloudy on sterilisation (PA 6-based), but then only has moderate gas barrier properties.

The object thus arises of providing a film based on polyamide and polyolefins which simultaneously exhibits the properties good thermoformability, heat sealability, sterilisability, elevated impermeability to gases (when dry and at elevated relative humidity), elevated transparency before and after sterilisation and good surface slip.

This object has surprisingly been achieved with a sterilisation-resistant barrier film based on polyamides and polyolefins, which is characterised in that the film consists of at least one aliphatic polyamide layer (A) and at least one polymer blend layer (B), which consists of 50–85 wt. % of polyarylamide and 15–50 wt. % of aliphatic polyamide and at least one thermoplastic heat sealing layer (C) of a polyolefin having a crystallite melting point of 121° C. or above (C1) or of a polymer blend containing at least one polyolefin having a crystallite melting point of 121° C. or above (C2) and at least one bonding layer (D), which are arranged in such a manner that a heat sealing layer and a layer of aliphatic polyamide are located on the outer sides of the film. The film must not be stretched.

The polyamide layer consists of the polyamides PA 6, PA 11, PA 12, PA 66, PA 6,66, PA 6,8, PA 6,9, PA 6,10, PA 6,11, PA 6,12, of a copolymer prepared from the monomer units contained therein or of a mixture of the stated polyamides.

The polyarylamide is a polycondensation product prepared from aromatic diamines and dicarboxylic acids, preferably such a product produced by polycondensation of m-xylylenediamine and adipic acid.

The thermoplastic heat sealing layer consists of a polymer from the group comprising polyethylenes, copolymers of polyethylene, polypropylenes, copolymers of polypropylene or polybutylenes or a blend containing at least one polymer stated in this section. This blend is preferably a polymer blend prepared from a linear low density polyethylene (LLDPE) and a low density polyethylene (LDPE) or a polymer blend prepared from an ethylene/propylene copolymer and a linear low density polyethylene (LLDPE).

The bonding layers consists of an adhesive system and/or a polymeric coupling agent. The adhesive system is a 2-component polyurethane adhesive system. The polymeric coupling agent is an anhydride-modified polyethylene, an acid copolymer of ethylene, an acid-modified ethylene vinyl acetate, an acid-modified ethylene (meth)acrylate, anhydride-modified ethylene (meth)acrylate, an anhydride-modified ethylene vinyl acetate, an acid/acrylate-modified ethylene vinyl acetate or a polymer blend containing at least one of the stated coupling agents. The coupling agent is preferably an anhydride-modified polyethylene or polypropylene copolymer.

At least one layer may be modified with lubricants and/or anti-blocking agents, wherein the lubricant is preferably an amide wax and the anti-blocking agent a modified natural silica product. It is particularly worthwhile to modify the sealing layer and/or the aliphatic polyamide layer with lubricants and anti-blocking agents.

Preferred film structures are:

A/D/B/D/C,

A/B/A/D/C or

A/EVOH/B/D/C, wherein EVOH is an ethylene/vinyl alcohol copolymer.

Interlayers having good adhesion to D and C may optionally be arranged between layers D and C, and may, for example, be identical to C.

Total thickness of the film is 15 to 400 μm, preferably 50 to 300 μm.

The film is suitable for printing. At least one layer may be coloured or printed.

The film is suitable in particular for packaging applications, in particular for packaging foodstuffs. The film is suitable for packaging meat and sausage products, milk products, fish and smoked products, ready prepared dishes, bread and bakery products and medical or technical devices.

It has surprisingly proved possible by means of the composition of the film according to the invention simultaneously to fulfil the requirements for good thermoformability, heat sealability, good surface slip, sterilisability, elevated impermeability to gas at low and high relative humidity and good transparency before and after sterilisation. It is known according to the prior art that good gas impermeability may be achieved by polymer layers of EVOH and MXD6. However, if these layers are sterilised, the layer becomes cloudy. If aliphatic polyamide is mixed with the EVOH as a blend component, clouding after sterilisation cannot be prevented. Surprisingly, however, a polymer blend of MXD6 and aliphatic polyamide gives rise to an oxygen-impermeable layer, which is not made cloudy by sterilisation and, in combination with the remaining claimed layers, fulfils the described range of requirements.

Production processes which may be considered for layers A, B and C are coextrusion (blown film or flat film) or also individual production of the layers which are subsequently laminated together (layer D). Combined processes are also conceivable.

Conventional prior art machine designs are used, wherein in the case of blown film coextrusion the process is characterised in that the melt is shaped into a tube which is inflated, cooled and, at the other now cool end, collapsed and held closed by pinch rolls and the film is then wound. In the case of flat film coextrusion, so called chill roll units are used having the particular feature of large chill rolls which receive the molten film as it leaves the die. The units to be used are fundamentally different from so-called stretching units, which cannot be used for the film of the present invention since they always produce a stretched product.

The following combined processes are particularly economic:

flat film coextrusion of a support with the structure A/D/B/D and subsequent extrusion or coextrusion coating of layer C onto D, optionally with interlayer(s) between D and C.

flat film coextrusion of the support A/EVOH/B, application of an adhesive D and subsequent lamination of a heat sealing layer C, which has previously been produced as a blown film, onto D, optionally with interlayer(s) between D and C.

flat film coextrusion of the support A/B/A, application of an adhesive D and subsequent lamination of a heat sealing layer C, which has previously been produced as a blown film, onto D, optionally with interlayer(s) between D and C.

One feature used to evaluate the invention was thermoformability. In order to determine thermoformability, the previously produced film samples were tested in modern automatic thermoforming machines as are used in the packaging industry (for example Tiromat, Multivac). To this end, the film webs clamped in the machine were heated in sections by a hot plate. Heating may be performed to this end either from the sealing side or also from the opposite side to the sealing side. The films preheated at hot plate temperatures of 95° C. were then thermoformed into a tray of edge dimensions 185×115 mm by application of a vacuum. The depth of the tray was 60 mm.

Sealability was tested using the sealing station of the above-stated machines, in which the previously thermoformed trays were sealed with a lid film of the same composition by heat (140° C.) and pressure (edge and areal sealing).

Oxygen permeability was also used to evaluate the invention. Oxygen permeability was determined using the carrier gas method to DIN 53 380, part 3. Oxygen permeability is accordingly the oxygen volume converted to standard conditions (0° C., 760 mm Hg) which passes through the film to be tested over a day (d=24 h) at a certain temperature and humidity and an oxygen partial pressure of 1 bar (dimension: $Ncm^3/(m^2*d*bar)$).

To this end, the film sample is clamped, forming a gas tight seal between the two parts of a permeation chamber. Oxygen (measuring gas) flows through one part of the chamber, and nitrogen (carrier gas) flows through the other part of the chamber, the nitrogen transporting the oxygen which has permeated through the sample to a highly sensitive electrochemical sensor. An electric current proportional to the chemically converted quantity is produced in the sensor and displayed. Due to the virtually complete conversion of the oxygen, its absolute quantity is measured irrespective of the flow rate of the carrier gas.

The sample films were also sterilised at 121° C. for 30 minutes in a countercurrent autoclave. Transparency after sterilisation was assessed visually in accordance with the categories, "yes" (no discernible difference in transparency before and after sterilisation) and "no" (film becomes cloudy as a consequence of sterilisation).

EXAMPLES AND COMPARATIVE EXAMPLES

The following examples are intended to illustrate the subject matter of the invention. Stretched films have not been examined since it is well-known to those skilled in the art that such films are not thermoformable.

a. Comparative Example 1

Multilayer non-stretched film of the type A/B/A/D/C with the structure $$PA6 / (MXD6) / PA6 / K / PE$$

$$15/15/15/-/75 \mu m$$

The five-layer film was laminated using a 2-component polyurethane adhesive K, wherein the three-layer support PA6/(MXD6)/PA6 was previously coextuded as a flat film and the PE heat sealing layer produced as a blown film. Total thickness is 120 μm. The PA6 used was a polyamide 6 of a density of 1140 kg/m³ having a crystallite melting point of 219° C. and a relative solution viscosity of 3.5 (PA concentration 1%, temperature 25° C., measured in m-cresol). MXD6 is a polycondensation product prepared from met-axylylenediamine and adipic acid having a crystallite melting point of 240° C., a glass transition temperature of 75° C. and a melt flow index of 0.5 (ASTM D 1238, condition K). The PE is an LLDPE of a density of 935 kg/m³, a crystallite melting point of 125° C. and a melt flow index (MFI 190/2.16) of 0.5 g/10 min.

b. Example 1

Multilayer non-stretched film of the type A/B/A/D/C with the structure $$PA6 / (80\% MXD6 + 20\% PA6) / PA6 / K / PE$$

$$15/15/15/-/75 \mu m$$

The five-layer film was produced as described in comparative example 1(a). The central polyamide layer consists of a polymer blend prepared from 80% MXD6 and 20% PA6. The polymers used are identical to those described in comparative example 1(a).

c. Example 2

Multilayer non-stretched film of the type A/B/A/D/C with the structure $$PA6 / (60\% MXD6 + 40\% PA6) / PA6 / K / PE$$

$$15/15/15/-/75 \mu m$$

The five-layer film was produced as described in comparative example 1(a). The central polyamide layer consists of a polymer blend prepared from 60% MXD6 and 40% PA6. The polymers used are identical to those described in comparative example 1(a).

d. Comparative Example 2

Multilayer non-stretched film of the type A/B/A/D/C with the structure $$PA6 / (aPA) / PA6 / K / PE$$

$$15/15/15/-/75 \mu m$$

The five-layer film was produced as described in comparative example 1(a). The central polyamide layer consists of an amorphous polyamide based on isophthalic acid and terephthalic acid of a density of 1190 kg/m³ and a glass transition temperature of 127° C. The PA6 and PE polymers used, together with the adhesive system K, are identical to those described in comparative example 1(a).

e. Comparative Example 3

Multilayer non-stretched film of the type A/B/A/D/C with the structure $$PA6 / (PA6) / PA6 / K / PE$$

$$15/15/15/-/75 \mu m$$

The five-layer film was produced as described in comparative example 1(a). The central polyamide layer, consists of a polyamide 6, as do the adjacent layers. K and PE are identical to those described in comparative example 1(a).

f. Comparative Example 4

Multilayer non-stretched film of the type A/B/A/D/C with the structure $$PA6 / (EVOH) / PA6 / K / PE$$

$$15/15/15/-/75 \mu m$$

The five-layer film was produced as described in comparative example 1(a). The layer between the PA6 layers consists of an ethylene/vinyl alcohol EVOH having an ethylene content of 32%, a density of 1190 kg/m³, a crystallite melting point of 181° C. and an MFI (190/2.16) of 1.3. The remaining polymers are identical to those described in comparative example 1(a).

g. Comparative Example 5

Multilayer non-stretched film of the type A/B/A/D/C with the structure

PA6 / (80% EVOH + 20% PA6, 12) / PA6 / K / PE

15 / 15 / 15 / – / 75 μm

The five-layer film was produced as described in comparative example 1(a). The central polyamide layer consists of a polymer blend prepared from an ethylene/vinyl alcohol EVOH having an ethylene content of 32%, a density of 1190 kg/m$^3$, a crystallite melting point of 181° C. and an MFI (190/2.16) of 1.3, and from a polyamide 6,12 (PA6,12) of a density of 1100 kg/m$^3$ and a crystallite melting point of 198° C. The remaining polymers are identical to those described in comparative example 1(a).

Table 1 summarises the assessment of the layer structures for the described films a, b, c, d, e, f and g. As may be seen, layers A, C and D were in each case according to the invention. In the comparative examples, layer B contains compositions which are not according to the invention.

TABLE 1

Layer composition

| | | Layer A | Layer B | Layer C | Layer D |
|---|---|---|---|---|---|
| a | Comparison 1 | invention | not according to the invention: 100% MXD6 | invention | invention |
| b | Example 1 | invention | invention: 80% MXD6 + 20% PA6 | invention | invention |
| c | Example 2 | invention | invention: 60% MXD6 + 40% PA6 | invention | invention |
| d | Comparison 2 | invention | not according to the invention: 100% aPA | invention | invention |
| e | Comparison 3 | invention | not according to the invention: 100% PA6 | invention | invention |
| f | Comparison 4 | invention | not according to the invention: 100% EVOH | invention | invention |
| g | Comparison 5 | invention | not according to the invention: 80% EVOH + 20% PA6,12 | invention | invention |

As may be seen from table 2, all films a to g are thermoformable and heat sealable. This table also shows oxygen permeability (OTR). The object was to provide a film which has low oxygen permeability. This means, for a film of the present thickness (see above), that oxygen permeability OTR should have a value in dry conditions (23° C., 0% relative humidity) and in a moist state (23 ° C., 90% relative humidity) of OTR<25 Ncm$^3$/(m$^2$*d*bar). It is not only films b and c produced according to the invention which fulfil this requirement, but also films a, f and g. An additional requirement was that the film to be provided should have not only the stated impermeability to gas, but also had to have the property of remaining transparent after sterilisation. Films a, f and g cannot fulfil this requirement.

In brief, it may thus be stated that it is possible to achieve only one of the properties, namely impermeability to gas or transparency after sterilisation, with the films which are not produced in accordance with the invention, while the films produced in accordance with the invention fulfil both requirements simultaneously.

TABLE 2

Thermoformability, heat sealabilty, oxygen permeability (OTR) at different humidities and transparency after sterilisation.

| | Thermoformable | Heat sealable | OTR [Ncm$^3$/ (m$^2$*d*bar)] 23° C.; 0% relative humidity | OTR [Ncm$^3$/ (m$^2$*d*bar)] 23° C.; 90% relative humidity | Transparent after sterilisation (121° C./30 min) |
|---|---|---|---|---|---|
| a | yes | yes | 13.8 | 10.3 | no |
| b | yes | yes | 13.3 | 12.1 | yes |
| c | yes | yes | 20.4 | 18.8 | yes |
| d | yes | yes | 30.5 | 21.3 | yes |
| e | yes | yes | 27.6 | 46.2 | yes |
| f | yes | yes | <1 | not measured | no |
| g | yes | yes | 1.3 | 6.1 | no |

We claim:

1. Sterilization-resistant barrier film based on polyamides and polyolefins, wherein the film consists of
    at least one layer (A) consisting of an aliphatic polyamide and
    at least one polymer blend layer (B), which consists of 50–85 wt. % of polyarylamide and 15–50 wt. % of aliphatic polyamide and
    at least one thermoplastic heat sealing layer (C) of a polyolefin having a crystallite melting point of 121° C. or above, or of a polymer blend containing at least one polyolefin having a crystallite melting point of 121° C. or above and
    at least one bonding layer (D),
    which are arranged in such a manner that a heat sealing layer and a layer of aliphatic polyamide are located on the outer sides of the film and in that the film is not stretched.

2. Film according to claim 1, wherein the aliphatic polyamide is selected from the group consisting of polyamides PA 6, PA 11, PA 12, PA 66, PA 6,66, PA 6,8, PA 6,9, PA 6,10, PA 6,11, PA 6,12, a copolymer prepared from the monomer units contained therein and mixtures thereof.

3. Film according to claim 1, wherein the polyarylamide is a polycondensation product prepared from aromatic diamines and dicarboxylic acids.

4. Film according to claim 1, wherein the thermoplastic heat sealing layer is selected from the group consisting of polyethylenes, copolymers of polyethylene, polypropylenes, copolymers of polypropylene or polybutylenes, and blends containing at least one of said polymers.

5. Film according to claim 1, wherein the thermoplastic heat sealing layer is a polymer blend prepared from a linear low density polyethylene (LLDPE) and a low density polyethylene (LDPE) or a polymer blend prepared from an ethylene/propylene copolymer and a linear low density polyethylene (LLDPE).

6. Film according to claim 1, wherein the bonding layers consist of an adhesive system, a polymeric coupling agent or both.

7. Film according to claim 6, wherein the adhesive system is a 2-component polyurethane adhesive system.

8. Film according to claim 6, wherein the polymeric coupling agent has a crystallite melting point of 121° C. or above and is an anhydride-modified polyethylene, an acid copolymer of ethylene, an acid-modified ethylene vinyl acetate, an acid-modified ethylene (meth)acrylate, anhydride-modified ethylene (meth)acrylate, an anhydride-modified ethylene vinyl acetate, an acid/acrylate-modified ethylene vinyl acetate or a polymer blend containing at least one of said coupling agents.

9. Film according to claim 8, wherein the coupling agent is an anhydride-modified polyethylene or polypropylene copolymer.

10. Film according to claim 1, wherein at least one layer is modified with lubricants, anti-blocking agents or both.

11. Film according to claim 1, wherein the sealing layer, the layer consisting of aliphatic polyamide or both are modified with lubricants and anti-blocking agents.

12. Film according to claim 10, wherein the lubricant is an amide wax.

13. Film according to claim 10, wherein the anti-blocking agent is a modified natural silica product.

14. Film according to claim 1, wherein the film has the structure A/D/B/D/C or A/B/A/D/C or A/C/B/D/C, wherein the polyolefin layer C that is located between layers A and B is EVOH and wherein EVOH is an ethylene/vinyl alcohol copolymer, and interlayers are optionally contained between layers D and C.

15. Film according to claim 1, wherein the total thickness of the film is 15 to 400 $\mu$m.

16. A package wrapped in a film according to claim 1.

17. A package according to claim 16, wherein the wrapped material is a foodstuff.

* * * * *